United States Patent [19]
Wei

[11] Patent Number: 5,473,621
[45] Date of Patent: Dec. 5, 1995

[54] ROTATIONALLY INVARIANT CODING

[75] Inventor: Lee-Fang Wei, Lincroft, N.J.

[73] Assignee: AT&T Corp., Murray Hill, N.J.

[21] Appl. No.: 869,983

[22] Filed: Apr. 16, 1992

[51] Int. Cl.[6] .............................. H04L 5/22; H04L 25/16
[52] U.S. Cl. .................... 371/43; 371/37.1; 371/37.7; 375/303; 375/308; 375/329
[58] Field of Search .......................... 371/43, 37.1, 37.5, 371/37.4, 37.7, 37.8, 40.3, 39.1, 41, 42, 44, 45, 51.1; 375/23, 42, 62, 67, 78, 79, 83

[56] References Cited

U.S. PATENT DOCUMENTS

| | | | |
|---|---|---|---|
| 4,483,012 | 11/1984 | Wei | 371/43 |
| 4,489,418 | 12/1984 | Mazo | 375/27 |
| 4,520,490 | 5/1985 | Wei | 371/43 |
| 5,022,053 | 6/1991 | Chung et al. | 375/39 |
| 5,023,889 | 6/1991 | Divsalar et al. | 371/43 |
| 5,115,453 | 5/1992 | Calderbank et al. | 371/37.8 |
| 5,117,427 | 5/1992 | Miyake et al. | 371/42 |
| 5,329,551 | 7/1994 | Wei | 375/17 |

OTHER PUBLICATIONS

A. M. Michelson and A. H. Levesque, *Error–Control Techniques for Digital Communication*, John Wiley & Sons, 1985, Chapter 6.

Primary Examiner—Robert W. Beausoliel, Jr.
Assistant Examiner—Dieu-Minh Le
Attorney, Agent, or Firm—Ronald D. Slusky; Kenneth M. Brown

[57] ABSTRACT

In a modulation scheme involving differential encoding and Reed-Solomon encoding, the differential encoding is performed before the Reed-Solomon encoding in the transmitter. In the receiver, a differential decoding operation is performed after an RS decoding operation. The overall coding scheme and the RS decoding are so arranged as to ensure that the RS decoding will be proper in the presence of phase rotations, notwithstanding the fact that the differential encoding is performed before the RS encoding in the transmitter and the fact that the RS decoding is performed before the differential decoding in the receiver.

29 Claims, 10 Drawing Sheets

ROTATIONALLY INVARIANT CODING

BACKGROUND OF THE INVENTION

The present invention relates to error detecting/correcting codes.

A useful class of error detecting/correcting codes are the so-called Reed-Solomon (RS) codes. In a typical application, a stream of input bits are divided into RS input words. The RS encoder generates a frame of RS output words generated in response to the RS input words. Where, for example, the RS code is a so-called systematic code, the output frame is comprised of the RS input words followed by one or more redundant words generated as a function of the RS input words.

In a typical application, the values of the RS encoder output words are communicated from a transmitter to a receiver over a communications channel by using a predetermined constellation of channel symbols to represent the various RS encoder output word values. Moreover, if in the particular application it is possible that the transmitted symbols will be "rotated" as the result, for example, of a so-called phase hit or other channel phenomenon, one or more of the output bits of the RS encoder can be differentially encoded so as to correct for this situation, as is well known. And in the receiver, the signal received from the channel will be differentially decoded prior to RS decoding.

SUMMARY OF THE INVENTION

I have recognized that there are at least two reasons why this approach is less than optimal. Firstly, the presence of the differential decoder "ahead of" the RS decoder doubles the number of symbol errors. Thus the introduction of differential encoding into such a system gives rise to the need for an RS code having about twice as much error correction capability as would be required if there were no differential encoding. Disadvantageously, this increases the complexity of the RS encoder and decoder. Additionally, the resulting increase in the number of the redundant words per frame reduces the bandwidth efficiency of the system, i.e., the rate at which information bits—as opposed to redundant bits—can be communicated over the channel, all other things being equal.

Another reason that the above approach is less than optimal is explained in detail in my co-pending U.S. patent application, entitled "Multilevel Coding Using Trellis-Coded Modulation and Reed-Solomon Codes," Ser. No. 07/869,985 filed of even date herewith and hereby incorporated by reference, now U.S. Pat. No. 5,258,987 issued Nov. 2, 1993. In brief, that application explains my realization that, in a so-called multilevel coded modulation environment in which certain input bits are encoded by an RS encoder and others are encoded by a trellis encoder and in which, moreover, it is necessary to differentially encode at least one bit of each type, the advantages one would hope to achieve via the use of such a multilevel coded modulation approach will, in general, not be realized if the differential encoder follows the RS encoder.

It is for both of these reasons—and possibly others—that I have realized that in some applications which combine differential encoding with some form of redundancy encoding, such as RS encoding, it is advantageous to perform the differential encoding before carrying out the redundancy encoding (and complementarily, in the receiver, carrying out the differential decoding after the redundancy decoding.) Indeed, arrangements embodying the principles of the invention perform the various encoding and decodings in just that way. Additionally, in accordance with an aspect of the invention, the overall coding scheme is so structured as to ensure that the decoder can operate properly even in the presence of phase rotations that will now appear at its input because differential decoding occurs after the redundancy decoding rather than before, as in the prior art.

The broad inventive concept as just stated is limited to so-called non-binary. rendundancy codes (of which RS codes are an example), which means that the units of redundancy provided by the code are comprised of more than one bit. It is so limited because there are, in fact, prior art arrangements in which the order of differential encoding/ decoding and redundancy encoding/decoding are the same as in the present invention. The prior art arrangements, however, we limited to binary redundancy codes, such as trellis codes and convolutional codes and it was not previously thought possible to use this order of encoding and decoding for non-binary codes because, unlike the case of binary codes, it was not thought possible for the decoders for non-binary codes to operate correctly in the presence of phase-rotation-induced data changes at their inputs.

Advantageously, I have discovered a technique for structuring the overall coding scheme in the aforementioned way—a technique that is certainly applicable to situations in which RS coding is used but may be applicable when other redundancy codes are used. The technique involves two criteria. The first criterion is that one must use a code which is amenable to accurate decoding notwithstanding the presence of some deterministic change made to each coded output word. This criterion is met by, for example, so-called full-length RS codes for which the deterministic change is the complementation of the bits at particular bit positions of each encoder output word. Moreover, a feature of the invention provides a decoder structure—described in the detailed description—which allows for the use of so-called shortened RS codes, even though those codes, in and of themselves, do not meet this criterion. The second criterion is that one must ensure that whatever rotations one is trying to protect against have no effect on the decoder input bits other than to cause the aforementioned deterministic change. The second criterion is easily met by using any of a virtually unlimited number of possible signal constellation/bit mapping schemes.

DETAILED DESCRIPTION

Figure 1:
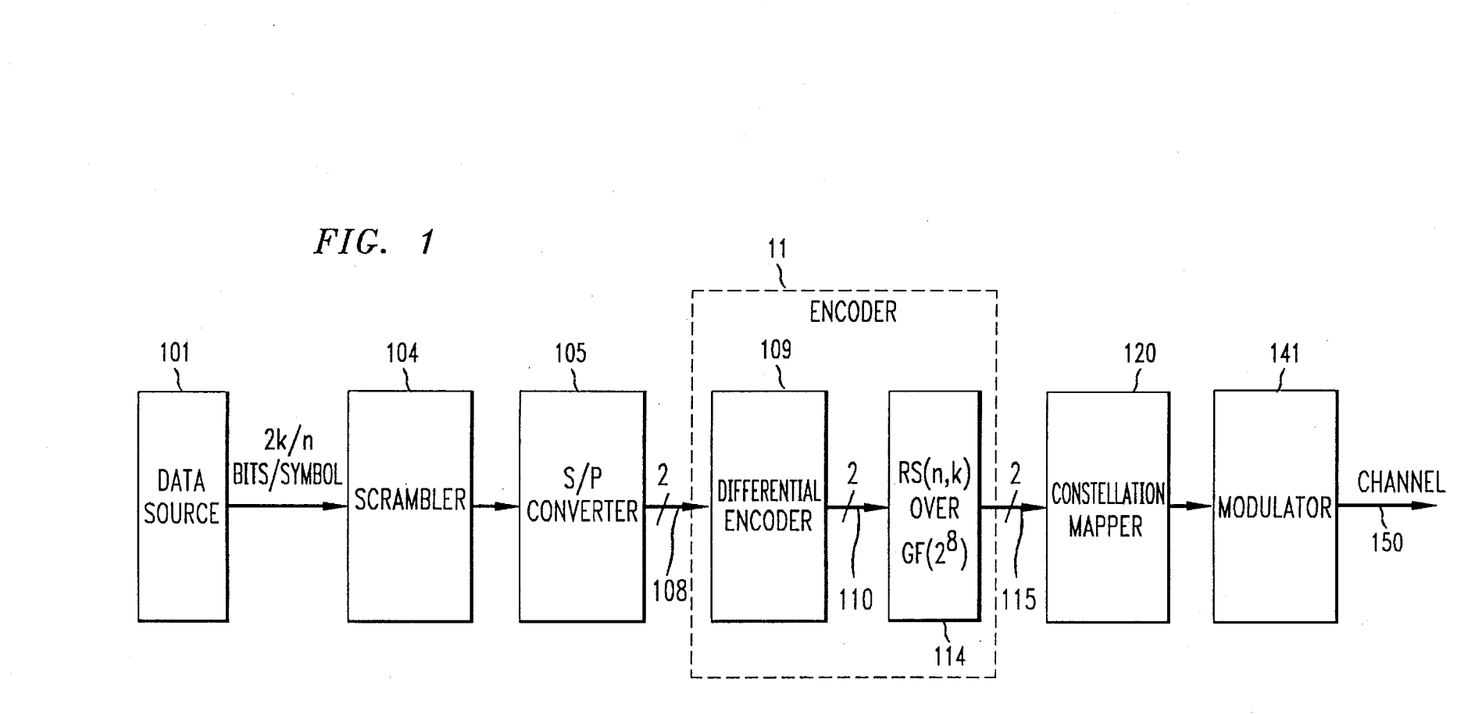
FIG. 1 is a block diagram of a data communications transmitter embodying the principles of the invention.

FIG. 1 is a block diagram of a data communications transmitter embodying the principles of the invention. In overall view, binary data from a data source 101—such as a personal computer—is caused to be represented by symbols taken from a predetermined pulse-amplitude-modulation (PAM) constellation. The symbols are modulated onto a carrier to generate a data-bearing signal that is transmitted over a transmission channel 150. A symbol is delivered to the transmission channel during each of a succession of "signaling intervals" of duration T. The constellation is illustratively the 4-symbol PAM constellation shown in FIG. 3.

As shown in FIG. 1, the stream of bits from source 101 is clocked into scrambler 104 at an average rate of 2k/n bits per signaling interval, where "k" and "n" are parameters of a Reed-Solomon code that is used in the transmitter, as is discussed in detail hereinbelow. Scrambler 104 randomizes the data in conventional fashion. The serial bit stream output of scrambler 104 is applied to serial-to-parallel (S/P) converter 105, which provides 2-bit output words on lead 108 for each signaling interval. (As will be clear from the context, various ones of the leads shown and described herein, such as lead 108, will be understood as being, in actuality, a bundle of leads, each of which carries a respective bit.) As will be described in detail hereinbelow, S/P converter 105 occasionally will be inhibited from providing any bits on lead 108 in order to allow for the insertion into the bit stream to be transmitted of redundant words from Reed-Solomon (RS) encoder 114 described below.)

Figure 4:
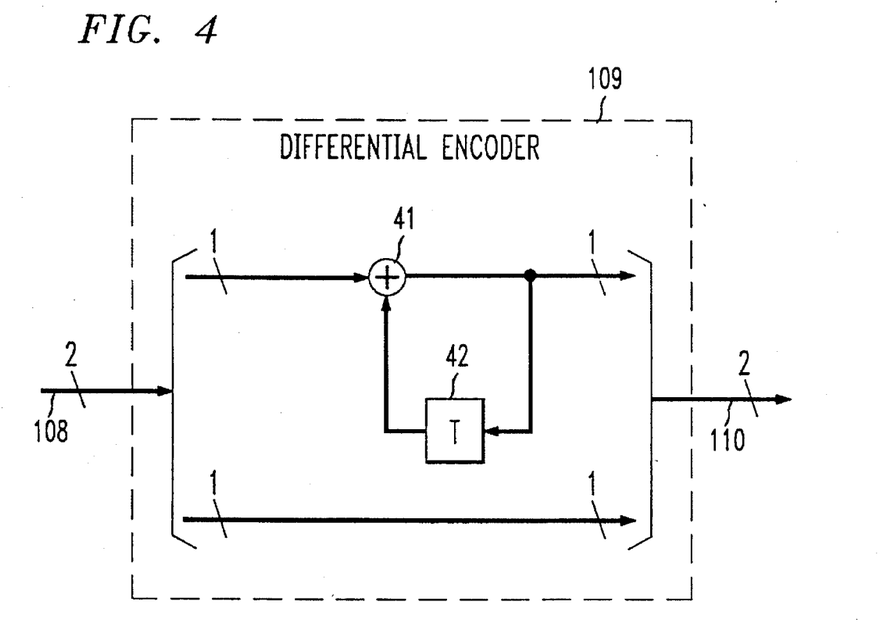
FIG. 4 shows the circuitry implementing the differential encoder used in the transmitter of FIG: 1.

The bits on lead 108 are applied to an encoder 11 and, more particularly, to a differential encoder 109 thereof which is of conventional design. The differential encoder generates a differentially encoded bit pair on its output lead 110. As is well-known by those skilled in the art, a differential encoder typically operates on a subset—typically one or two—of the bits that are applied in parallel to it, with the other bits simply being passed through the differential encoder unchanged. Thus looking briefly at FIG. 4, the differential encoder takes the "lower" one of the two input bits that it receives for each signaling interval and passes it through to the differential encoder output lead 110 unchanged. The other differential encoder output bit is generated by processing the "upper" bit received for each signaling interval via the circuitry shown, that circuitry comprising exclusive-OR gate 41 and T-second delay element 42. (Differential decoder 240 in the receiver, described below, has a complementary structure which will be apparent to those skilled in the art.)

Returning to FIG. 1, the bits on lead 110 are applied within encoder 11 to RS encoder 114, and it is the output of the latter which is used to select a particular symbol from the constellation of FIG. 3, as described more fully below.

Figure 5:
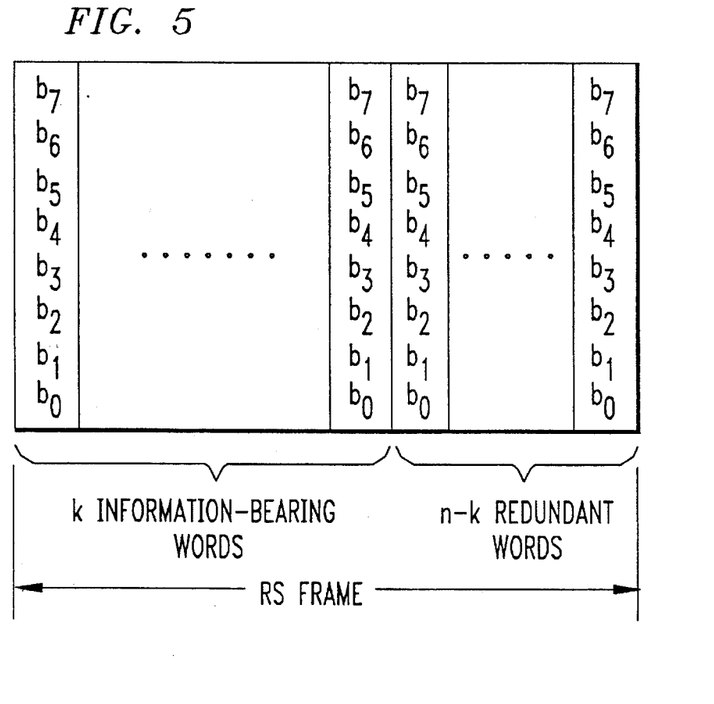
FIG. 5 shows the structure of a Reed-Solomon frame.

RS encoder 114 is of a known type—illustratively, a conventional, rate-k/n systematic encoder over $GF(2^8)$. Reed Solomon coding and decoding is described, for example, in Michelson et al, *Error Control Techniques for Digital Communication*, Chapter 6, John Wiley and Sons, 1985. As such, encoder 114 provides its outputs in RS frames, each of which, as shown in FIG. 5 is comprised of k eight-bit information-bearing words followed by (n-k) redundant words. Each of the information-bearing words is comprised of the eight bits $b_0, b_1, \ldots b_7$ accumulated from four signaling-intervals-worth of bits, with the bits $b_1, b_0$ respectively being the upper and lower bits on lead 110 for the first of the four signaling intervals; $b_3, b_2$ respectively being the upper and lower bits on lead 110 for the second of the four signaling intervals; and so forth. Each of the redundant words is generated as a function of the information-bearing words by the RS encoder in standard fashion. These words are also comprised of eight bits which are also labeled $b_0, b_1, \ldots b_7$. A RS code is a non-binary code because the units of redundancy—the aforementioned redundant words—are each comprised of more than one bit. The values of the bits of any particular redundant word have no use or meaning by themselves; it is the overall value of the redundant word as defined by all its bits that is used by the RS code to provide error detection/correction. This is in contradiction to such binary redundancy codes as trellis codes and convolutional codes in which the value each redundant bit has independent meaning in the receiver.

Again returning to FIG. 1, the output of encoder 114 is extended to constellation mapper 120 via lead 115. Since the code is systematic, RS encoder 114 simply outputs the two-bit pairs from lead 110 onto lead 115 as soon as they are received for a duration of 4k signaling intervals, thereby providing the k information-bearing words of the frame. At this point, the outputting of further bits from S/P converter 105 is inhibited for 4(n-k) signaling intervals and the operation of differential encoder 109 is "frozen" during that period. Thus the supplying of inputs to RS encoder 114 is halted. S/P converter 105 illustratively includes buffer circuitry which stores up the bits which continue to be delivered by scrambler 104. During those 4(n-k) signaling intervals, then, RS encoder 114 can output the (n-k) redundant words. Since each 4k out of each frame of 4n signaling intervals carries information-bearing bits—specifically two information-bearing bits—it can be seen that the average number of bits required from source 101 is, indeed, 2k/n bits per signaling interval as noted earlier.

Figure 3:
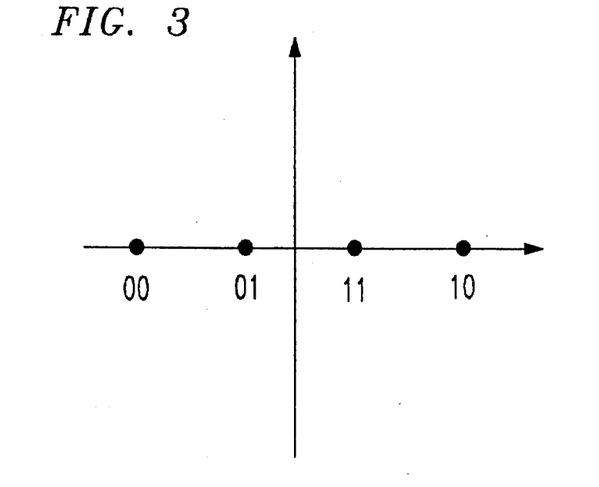
FIG. 3 shows a four-symbol pulse-amplitude-modulation (PAM) constellation illustratively utilized by the transmitter of FIG. 1.

FIG. 3 shows how each bit pair value on lead 115 is illustratively assigned, or "mapped to," an associated one of the four symbols of the PAM constellation by mapper 120. As each pair of bits on lead 115 is applied to constellation mapper 120, the latter outputs a representation (e.g., the x coordinate value) of the associated symbol. Those representations are applied to conventional modulator 141, which applies to channel 150 an outgoing data signal representing those symbols.

Figure 2:
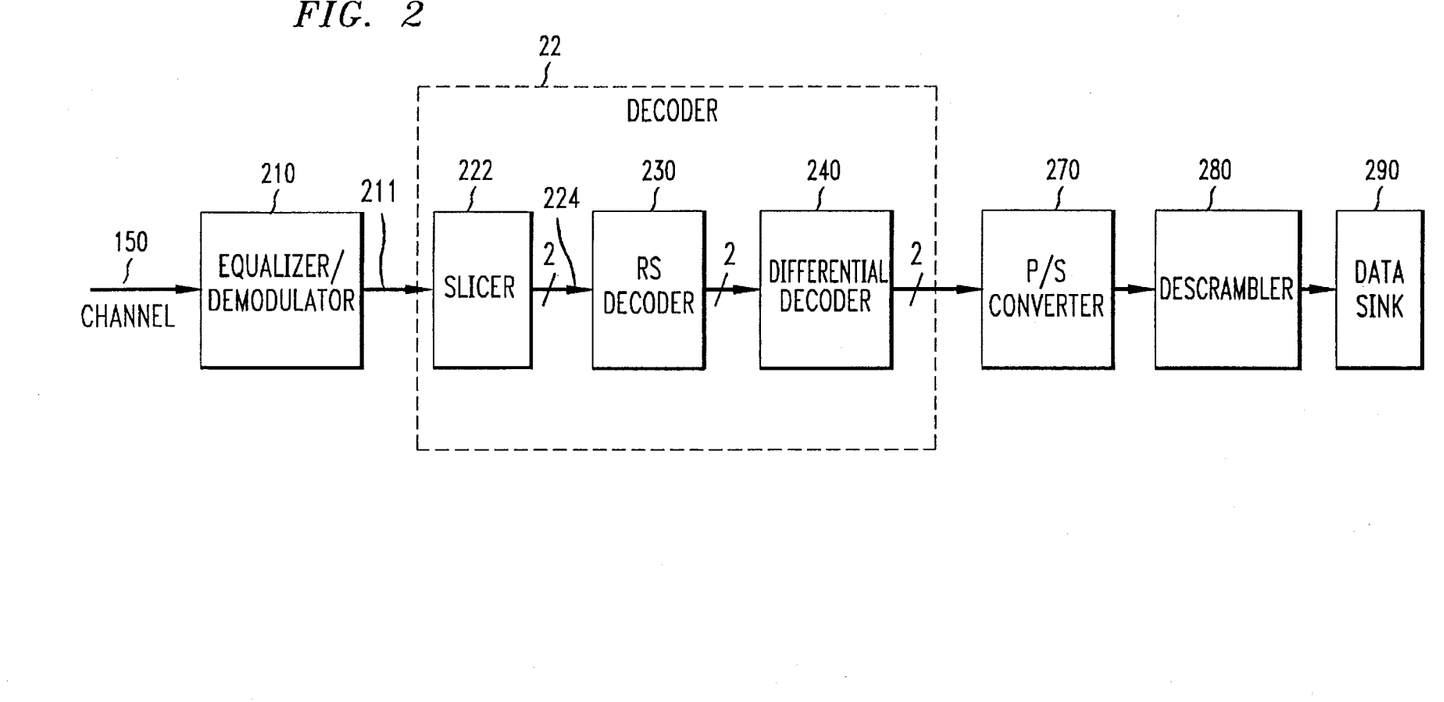
FIG. 2 is a block diagram of a data communications receiver capable of receiving and processing the data signals generated by the transmitter of FIG. 1.

The receiver of FIG. 2 receives from channel 150 the data signal generated by the transmitter of FIG. 1. The signal is first applied to equalizer/demodulator circuitry 210 which, in conventional fashion, recovers a sequence of symbols which it provides on lead 211 to slicer 222 within decoder 22. Because of distortion and other channel anomalies that circuitry 210 is not able to fully compensate for, the signals on lead 211 represent a sequence of signal points which are displaced in signal space from the PAM symbols that were transmitted. The function of slicer 222 is to find the symbol of the 4-PAM constellation which is closest to each signal point that appears on lead 211 and to output the corresponding two-bit pattern—a process sometimes referred to as making "hard decisions." Assuming that no transmission errors were made, the stream of two-bit patterns on slicer output lead 224 will be identical to the stream of two-bit patterns that were provided in the transmitter at the input of constellation mapper 120 on lead 115.

The remainder of the processing performed in the receiver of FIG. 2 is the inverse of processing performed in the transmitter. Thus, in particular, and still within decoder 22, RS decoder 230 operates on each received frame of 4n signaling-intervals-worth of bits on lead 224 to recover the k information-bearing eight-bit words therein. In particular, the decoder is capable of identifying and correcting any (n-k)/2 eight-bit words provided on lead 224 that have errors or n-k erased words or various combinations of errors and erasures, as is well known in the prior art. The stream of k corrected information-bearing words is supplied by RS decoder 230 on lead 232 within encoder 22 to differential decoder 240, whose output is thereafter converted to serial form by parallel-to-serial converter 270, de scrambled by descrambler 280, and applied to a data sink 290 which may be, for example, a mainframe computer.

The need for differential encoding/decoding in the system of FIGS. 1–2 arises from the fact that in telephone channel, digital television broadcasting and other applications, so-called phase hits or other channel phenomena may cause the received signal points, as represented at the output of equalizer/demodulator 210, to be phase-rotated versions of the signal points that were transmitted. Looking in particular at the constellation of FIG. 3, it will be seen that the constellation itself—i.e., the locations of symbols on the horizontal axis-remains the same if the symbols thereof were to be rotated by 180 degrees. Such a constellation is said to exhibit 180-degree phase symmetry. Given this symmetry, it would be possible, upon a 180-degree rotation of the constellation, for the receiver circuitry to begin to mistake each transmitted symbol for a different symbol of the constellation—and thereby output erroneous bit patterns—without any indication that an error was in fact made. In order to compensate for such rotation, it is well known to use differential encoding in order to represent one or more of the data bits to be transmitted not by particular symbols, but by the phase difference between two successively transmitted symbols.

In the prior art, the differential encoding would be performed after the RS encoding in the transmitter and, complementarily, the differential decoding would be performed in the receiver before the RS decoding. The reason for this is that a conventional RS decoder is not, in general, capable of carrying out its function properly if the bits supplied to it have been changed as the result of phase rotations. By performing the differential decoding prior to the RS decoding, then, it is guaranteed that there will be no phase-rotation effects in the RS decoder input bits.

This prior an approach will, indeed, be effective for handling phase rotations. Disadvantageously, however, the introduction of differential encoding/decoding in this way doubles the number of error-corrupted two-bit pairs appearing in the RS decoder input. This is because the differential decoder output is formed by taking modulo differences between the bit pairs applied to it for present and previous signaling intervals. Thus a single erroneous bit pair at the input of the differential decoder affects two bit pairs at its output. Thus, up to twice the number of RS words in that input are in error, depending on the extent to which erroneous bit pairs appear in the same or different RS words.

Given this, the RS code that is used in the system must have a substantially greater error correction capability—and therefore is also less bandwidth efficient—than it would have to have if there were no differential encoder. (A full doubling of the error-correction capability may not be required in this particular embodiment, for example, because only in one time out of four will an error at the input of the differential decoder cause more than one erroneous RS word at the input of the RS decoder.) A further disadvantage arises in multilevel coding contexts, as is discussed in my aforementioned co-pending U.S. patent application.

In accordance with the invention, the differential encoding is carried out ahead of the RS encoding in the transmitter, as is, in fact, shown in FIG. 1, and differential decoding is carried out after the RS decoding in the receiver, as is, in fact, shown in FIG. 2. Thus, the aforementioned problem—the loss of bandwidth efficiency due to the need to increase the error correction capability of the RS code—is obviated. Now, of course, the bits applied to RS decoder 230 on lead 224 will be subject to changes due to phase rotation, as noted earlier. However, as long as one so structures the overall coding scheme as to ensure that the RS decoder can operate properly even in the presence of phase rotations at its input, an overall improved system results. Advantageously, I have discovered a technique for so structuring the overall coding scheme—a technique that is certainly applicable to situations in which RS coding is used but may be applicable to other situations as well.

Overall, then, the ability of the RS decoder to detect the occurrence of an error due to impairments other than that for phase rotation is not diminished. Thus, the RS decoder can go ahead to correct any such error or erasure as though there were no such rotation, except that, in the corrected word, the complementation is preserved. Finally, the rotation-induced complementation itself can be corrected for by carrying out the differential encoding/decoding in the desired manner mentioned above, i.e, performing the differential encoding before RS encoding in the transmitter and differential decoding after RS decoding in the receiver.

The aforementioned technique involves two criteria.

Figure 6:
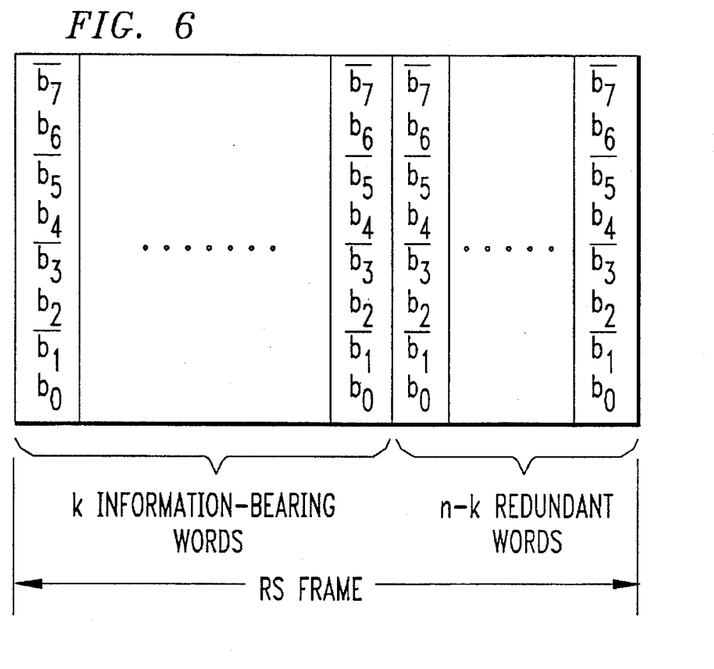
FIG. 6 shows the Reed-Solomon frame after a rotation-induced complementation.

The first criterion is that one must use a code which is amenable to accurate decoding notwithstanding the presence of some deterministic change made to each coded output word. For example, such a deterministic change might be the complementation of the bit at particular bit positions of each encoder output word. Indeed, this first criterion is met by, for example, so-called full-length RS codes for which, in fact; the above-mentioned complementation property is the deterministic change. In particular, it is a property of RS codes that, if the frame length is $(2^m-1)$ words, where m is the number of bits in each RS word (here m=8)—that frame length being referred to herein as the "full frame length"—then the complementation of the bits in any one or more of the m bit positions, occurring consistently for all the words of a valid RS frame, results in another valid RS frame. By "valid RS frame" is simply meant any sequence of words which the RS encoder algorithm allows the RS encoder to generate. Thus, comparing FIGS. 5 and 6, it will be seen that the odd-numbered bits, $b_1$, $b_3$, . . . of each RS word of FIG. 5 are complemented in FIG. 6. The frame of RS words shown in FIG. 6 is, indeed, a valid frame if the frame of RS words in FIG. 5 is valid.

The second criterion is that one must ensure that whatever rotations one is trying to protect against have no affect on the decoder input bits other than to cause that deterministic change. This criterion is easily met by using any of a virtually unlimited possible constellation/bit mapping schemes including, for example, that shown in the FIG. 3. In particular, as noted earlier, the constellation of FIG. 3 has a 180-degree phase symmetry. Moreover, the mapping of bit pairs to symbols of the constellation is such that, upon a 180-degree rotation of that constellation, the first bit of the bit pair associated with each symbol is complemented while, illustratively, the second bit remains unchanged. That is, the bit pairs 00, 01, 11 and 10 become 10, 11, 01, and 00, respectively. This then results in the pattern of complementation shown in FIG. 6. Accordingly, RS decoding can be carried out normally by RS decoder 230 irrespective of the rotation. We need only correct for the complementation itself via the use of differential encoder 106 in the transmitter and differential decoder 240 in the receiver.

In many applications, it is desirable from a number of standpoints to use a frame length which is smaller—and often substantially smaller—than the aforementioned full frame length. Processing delay and the desire to accommodate various different bit rates by varying the number of bits per RS word while maintaining a constant frame length are two reasons that it may be desired to do this. Shorter frame lengths are achieved using so-called "shortened" RS codes. Unfortunately, however, the above-described complementation property of the RS code is lost when the frame length is other than the full frame length. That is, the complementation of the bits in any one or more of the m bit positions, occurring consistently for all the words of a valid RS frame, will not result in another valid RS frame—at least not in general.

This potential limitation of the use of shortened RS codes is overcome via a unique RS decoding technique in accordance with a feature of the invention. That feature involves an enhanced technique for calculating the so-called syndromes of an RS code. As is well known, the way in which the RS code is decoded is to first calculate (n-k) m-bit syndromes, in response to the received frame of RS words. If all of the bits of a syndrome have the value "0", it is referred to herein as a "zero syndrome." Otherwise, the syndrome is referred to as a "non-zero syndrome." If all the syndromes are zero syndromes, then it is assumed that there were no transmission errors or erasures. (Hereinafter, the term "errors" will be used to encompass both errors and erasures.) On the other hand, if any one or more of the syndromes is a non-zero syndrome, then it is known that there were one or more transmission errors. The values of syndromes are then used to attempt to correct the errors and, indeed, the errors can be corrected as long as the number of errors is within the error-correcting capability of the code.

In accordance with this feature of the invention, two sets of syndromes are calculated for each RS frame which, it will be remembered, is now a shortened RS frame. The first set of syndromes is arrived at by processing the shortened frame straightforwardly. We refer to these as the "standard syndromes." The second set of syndromes—which we refer to as the "modified syndromes"—are the set of syndromes calculated straightforwardly from a particular full length frame. That full length frame is the frame comprised of a) ($2^m-1-$ n) m-bit "stuffing" words, $\vec{C}$—the value of $\vec{C}$ being obtained by subjecting a m-bit null word, i.e., a word comprised of m "0"s, to the complementation pattern caused by the rotation of the constellation—combined with b) the n RS words of the shortened frame. Although any of various patterns of these ($2^m-1$) words can be used—as long as the RS encoder and the syndrome calculation are appropriately configured—it is preferable for simplicity of implementation that the frame be comprised of all of the stuffing words followed by all of the RS words of the shortened frame. In the present example, then, the value of C is 10101010—corresponding to the pattern of complementation shown in FIG. 6. In preferred embodiments, the modified syndromes are generated using a shortcut method in which we simply add respective fixed constants to the standard syndromes. The constants that are added to each standard syndrome are the corresponding ones of the syndromes calculated for a full length frame consisting of a) $2^m-1-$ n of the stuffing words, followed by b) n words each comprised of m bits of value "0".

Figure 11:
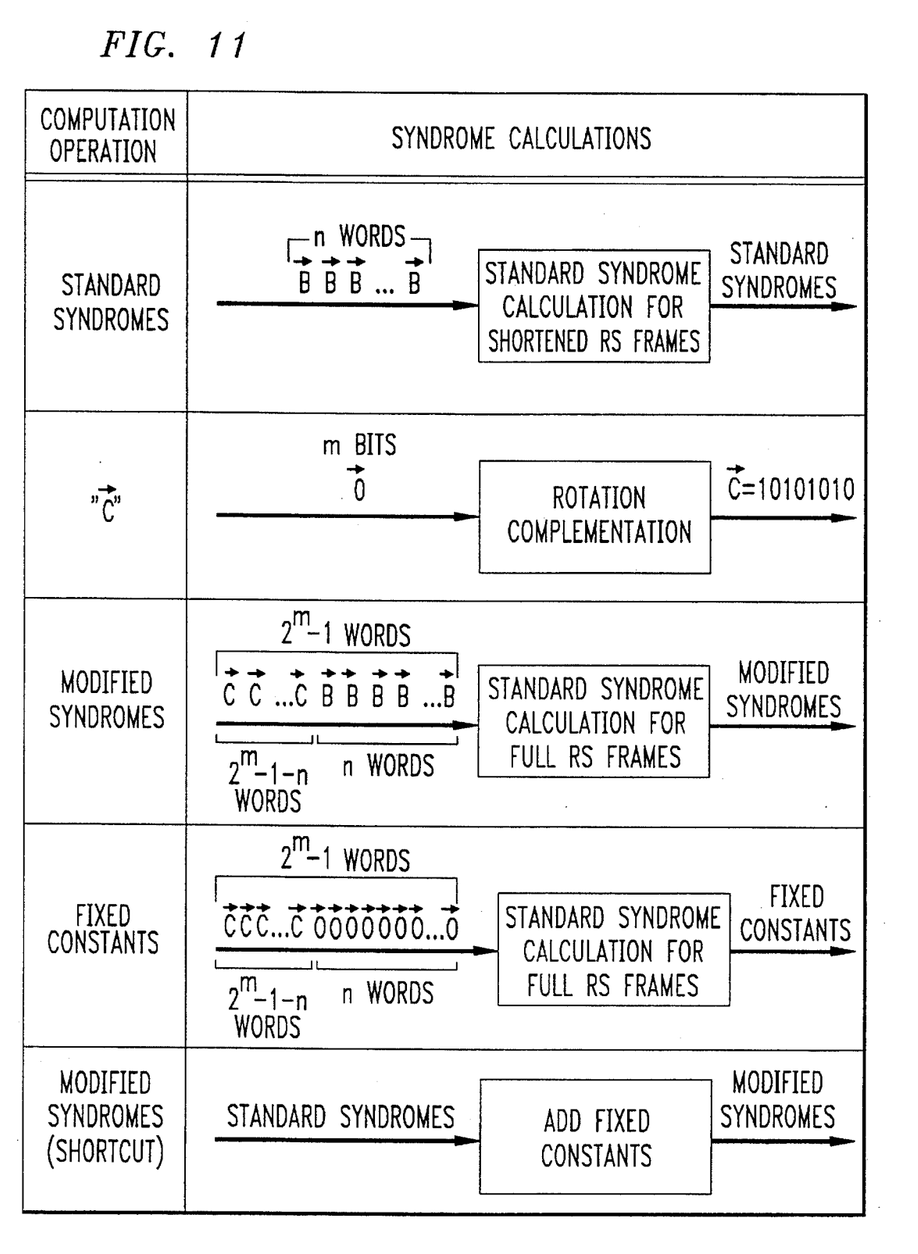
FIG. 11 is a chart helpful in understanding the operations shown in FIG. 7.

The foregoing is illustrated graphically in FIG. 11. The first line entry shows that standard syndromes are computed by subjecting the received shortened RS frame, comprised of n m-bit words, each denoted $\vec{B}$, to a standard syndrome calculation for shortened frames. The second line entry shows that the vector $\vec{C}$ is calculated by subjecting the vector $\vec{0}$, comprising m bits of value zero, i.e., 00000000, to the complementation which occurs upon a constellation rotation. The third line entry shows how the modified syndromes can be computed by subjecting a full-length frame comprised of $\vec{C}$ and $\vec{B}$ words to the standard syndrome calculation for full-length frames. The fourth line entry shows that the aforementioned fixed constant used in the shortcut method of computing the modified syndromes is computed by subjecting a full-length frame comprised of $\vec{C}$ and $\vec{O}$ words to the standard syndrome calculation for full-length frames. And the fifth line entry shows how the modified syndromes are computed using the shortcut method by simply adding the fixed constant to the standard syndromes calculated for the received shortened RS frames.

Assuming no transmission errors due to impairments other than phase rotations, only one set of syndromes will be zero syndromes. Specifically, only the standard syndromes will be zero syndromes if there was no rotation and only the modified syndromes will be zero syndromes if there was a rotation. This relationship can then be used in the manner shown in the flowchart of FIG. 7 to decode the received RS words.

Figure 7:
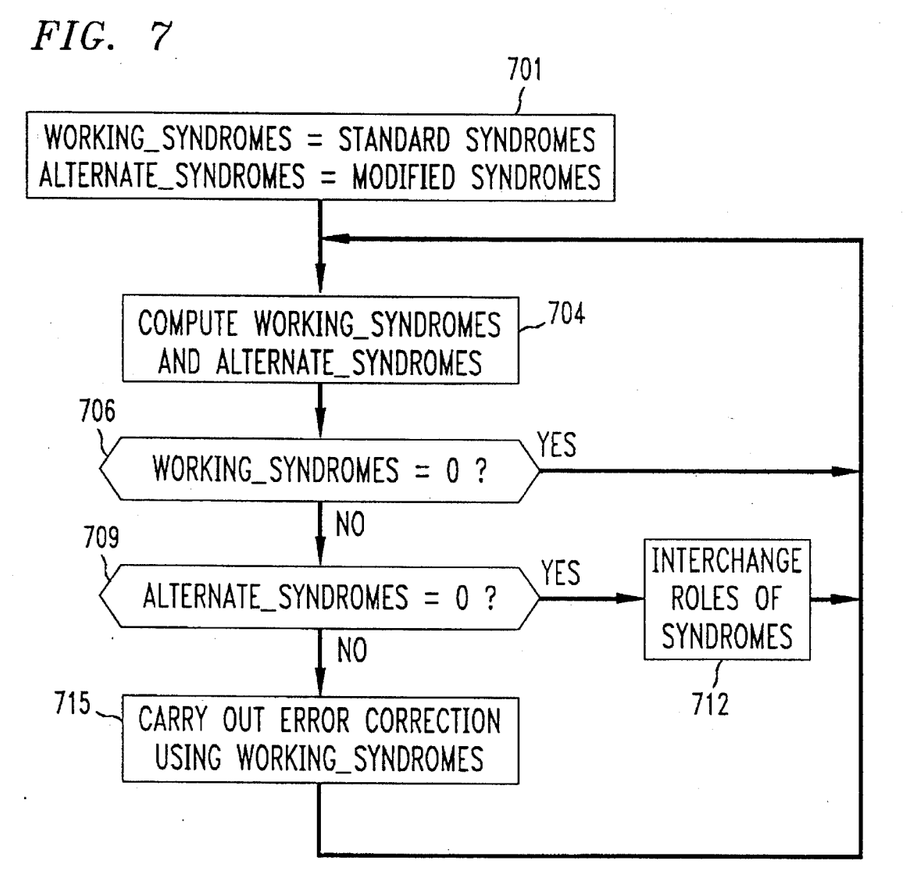
FIG. 7 is a flowchart of the operations of the Reed-Solomon decoder of FIG. 2 embodying a feature of the present invention.

Specifically, we begin at step 701 by defining two variables—the "working_syndromes" and the "alternate_syndromes." Initially, the working_syndromes are defined to be the standard syndromes and the alternate_syndromes are defined to be the modified syndromes. Then, as shown at 704, the working_syndromes and alternate_syndromes are computed. If the working_syndromes are zero syndromes, as determined at step 706, then it is assumed that there are no errors. Accordingly, no error correction is needed. Moreover, because at this time it is the working_syndromes that are the zero syndromes, this means—as will be clearly understood from what follows—that there was no phase rotation relative to the previous frame. Thus nothing further is to be done and return is made to step 704 to process the next RS frame.

If, on the other hand, the working_syndromes are not zero, this may be simply the result of a rotation relative to the previous frame, as opposed to a true transmission error. This possibility is considered at step 709 at which the values of the alternate_syndromes are examined. If these syndromes are zero syndromes then, in fact, there was such a rotation. In this case, too, no error correction is needed. Now, however, we want to assume from this point forward that the constellation has been rotated relative to what its orientation was in the previous frame until such time as we deduce to the contrary. Thus, the roles of the standard and modified syndromes are reversed at step 712. Specifically, the working_syndromes will change from the standard syndromes to the modified syndromes or from the modified syndromes to the standard syndromes, and likewise for the alternate_syndromes. Return is again made to step 704 to process the next frame.

Alternatively, it may be found at step 709 that the alternate_syndromes are also non-zero syndromes. In this case, it is clear that there were one or more transmission errors. There may also have been a rotation relative to the previous frame. Since it cannot be determined, however, whether there was such a rotation or not, it is not assumed that there was one. Rather, the non-zero values of the working_syndromes are assumed to be simply the result of transmission errors. Thus error correction is carried out straightforwardly at step 715 using the working_syndromes; the roles of the working_syndromes and alternate_syndromes are not reversed; and return is again made to step 704 to process the next frame.

The process represented by FIG. 7 can be summarized as comprising two steps performed in repetitive alternation. Those steps are:

a) initiating the use of the standard syndromes to carry out error correction/detection for the received frames until it is determined that the shortened RS frames are being subjected to the above-described complementation—illustratively by observing that the modified syndromes have become zero syndromes, and b) thereupon initiating the use of the modified syndromes to carry out error correction/detection for subsequent frames until it is determined that the shortened RS frames are no longer being subjected to that complementation—illustratively by observing that the standard syndromes have become zero syndromes.

Figure 12:
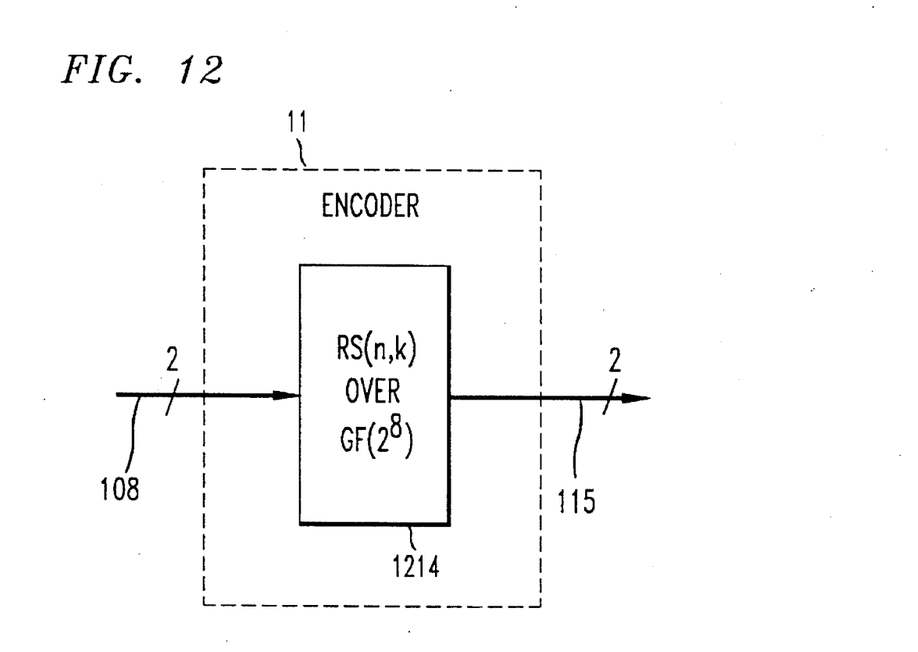
FIGS. 12 and 13 respectively show an alternative encoder and decoder structure that can be used in the system of FIGS. 1–2 in accordance with a feature of the invention.
Figure 13:
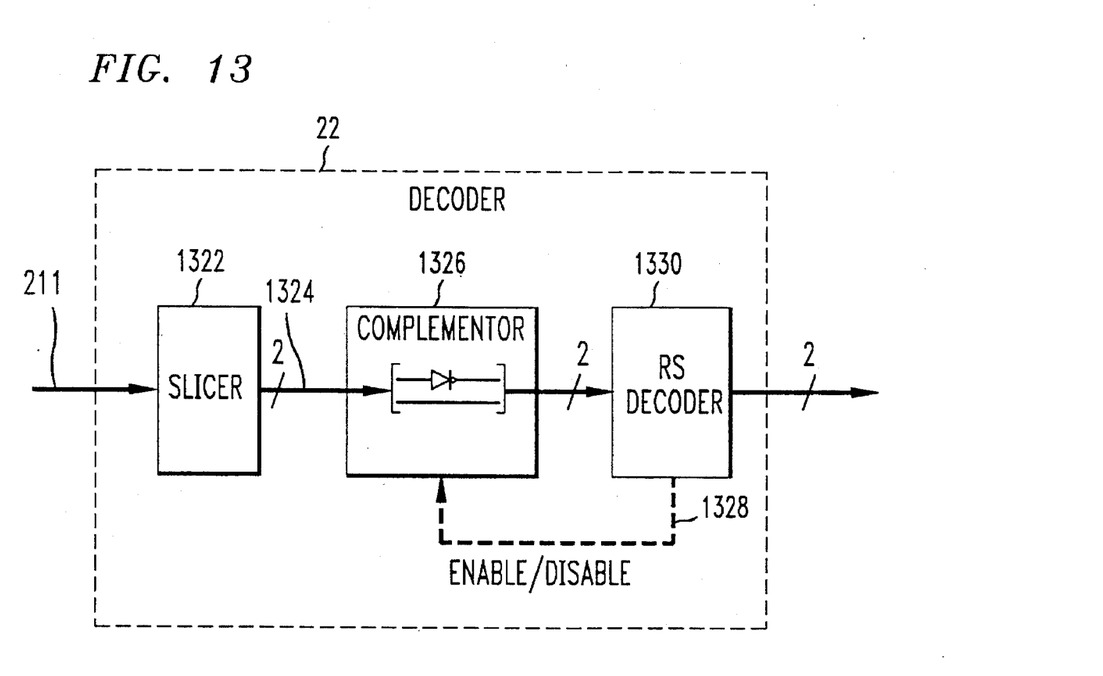

In accordance with a feature of the invention, computation of the modified syndromes can be used as a way of detecting the occurrence of a phase rotation, thereby obviating the need for a differential encoder or decoder. In such an arrangement, then, encoder 11 will simply comprise an RS encoder 1214, as shown in FIG. 12. The corresponding decoder 22 is shown in HG. 13. This decoder includes slicer 1322, which operates in the same way as slicer 222. It also includes a complementor 1326, which when enabled via a signal on lead 1328, complements the upper bit of each two bit pair on slicer output lead 1324. This complementation reverses the bit complementation effect of the phase rotation described above. The output of the complementor feeds into RS decoder 1330 which is equipped to a) carry out standard RS error detection/correction and b) compute modified syndromes for each frame in the manner described above.

Figure 14:
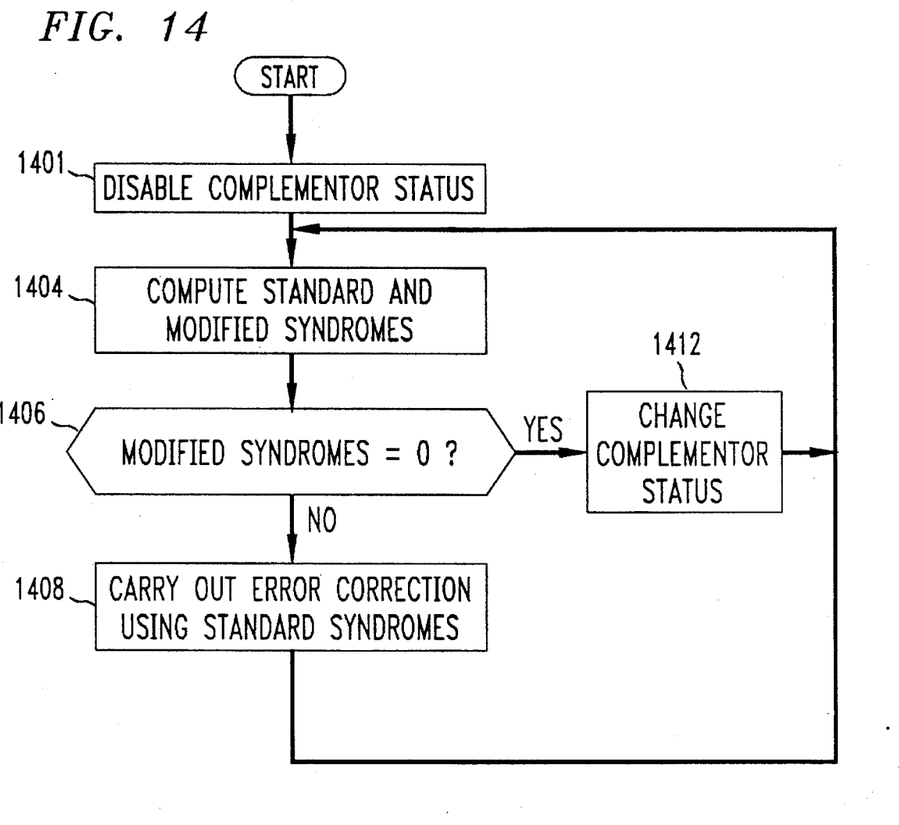
FIG. 14 is a flowchart of operations performed within the decoder of FIG. 13.

The operation of the decoder of FIG. 13 is shown in FIG. 14. In particular, complementor 1326 is initially disabled, as indicated at 1401, so that the complementor output is the same as its input. The standard and modified syndromes are then computed at step 1404, if, as determined at step 1406, the modified syndromes are not zero, there is no reason to believe that a rotation has occurred relative to the previous frame. Therefore, error correction/detection proceeds in standard fashion (using the standard syndromes) at step 1408 and return is made to step 1404 to process the next frame. On the other hand, if the modified syndromes are determined at step 1406 to be zero syndromes, it is assumed that a rotation relative to the previous frame has, in fact, occurred. We remember that a rotation causes a complementation of the upper bit of each bit pair. Therefore, the effects of a rotation can be accounted for by simply reversing that complementation. Thus, there is no need for the overall transmitter/receiver system to use any differential encoding inasmuch as the function of the latter is also to reverse the effects of rotations in the channel.

The complementation reversal, in particular, is illustratively carried out by a) causing RS decoder 1330 to complement the upper bit of each bit pair within the RS frame that is currently being output by the RS decoder (a step not explicitly shown in FIG. 14), and b) as indicated at 1412, changing the status of complementor 1326—enabling it if it was disabled and vice versa—via a control signal provided to complementor 1326 by RS decoder 1330. Return is then made to step 1404 as before. As the result of the change in the status of the complementor, subsequent frames applied to RS decoder 1330 will not manifest the complementation and the standard syndromes can continue to be used for error detection/correction.

The invention is not only useful in so-called unilevel coded modulation schemes, such as that shown in FIGS. 1–2, but also in multilevel coded modulation schemes. An example of the latter is shown in my aforementioned copending patent application. Such a multilevel coded modulation scheme could be realized in the context of the present disclosure by substituting the encoder and decoder of FIGS. 8 and 9 for encoder 11 and decoder 22 of FIGS. 1 and 2, respectively, and using the constellation of FIG. 10 rather than that of FIG. 3.

Figure 8:
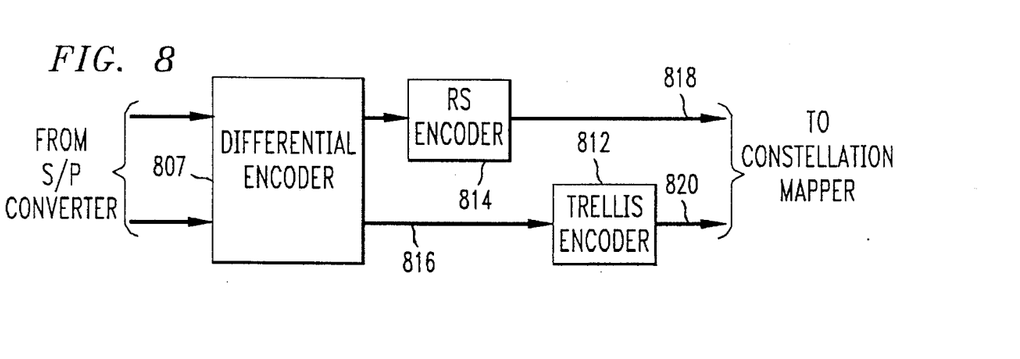
FIGS. 8 and 9 show alternative structures for the encoder and decoder used in the transmitter of FIG. 1 and receiver of FIG. 2, respectively.
Figure 9:
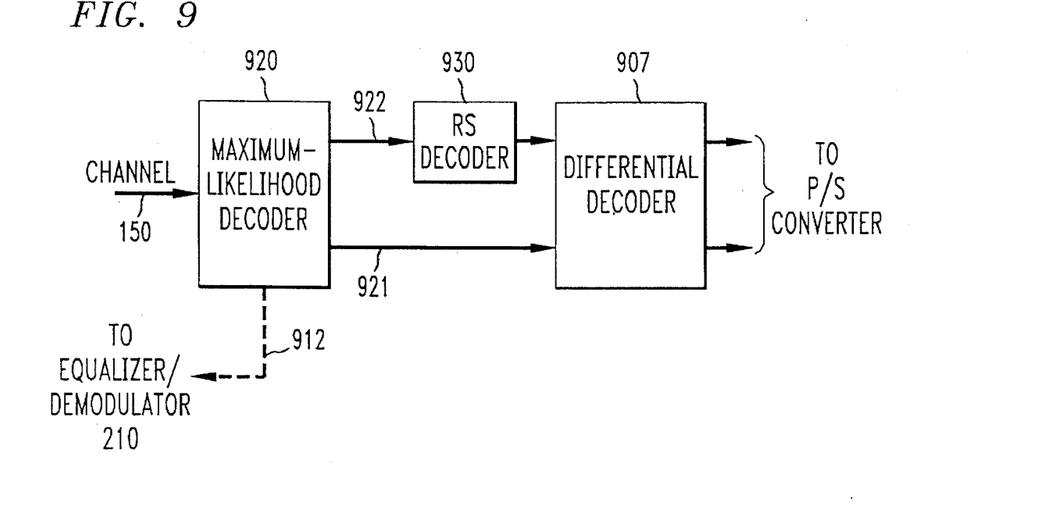

Per the present invention, it will be seen from FIGS. 8 and 9 that, in the transmitter, differential encoding is performed by differential encoder 807 before being RS encoded by RS encoder 814 and that, in the receiver, differential decoding is performed by differential decoder 907 after RS decoding is performed by RS decoder 930. Here, however, there is a second "rail" of bits which, illustratively, passes through differential encoder 807 unmodified but is then applied on lead 816 to a trellis encoder 812. The latter may be the 4D, 64-state trellis encoder of my aforementioned co-pending patent application.

Figure 10:
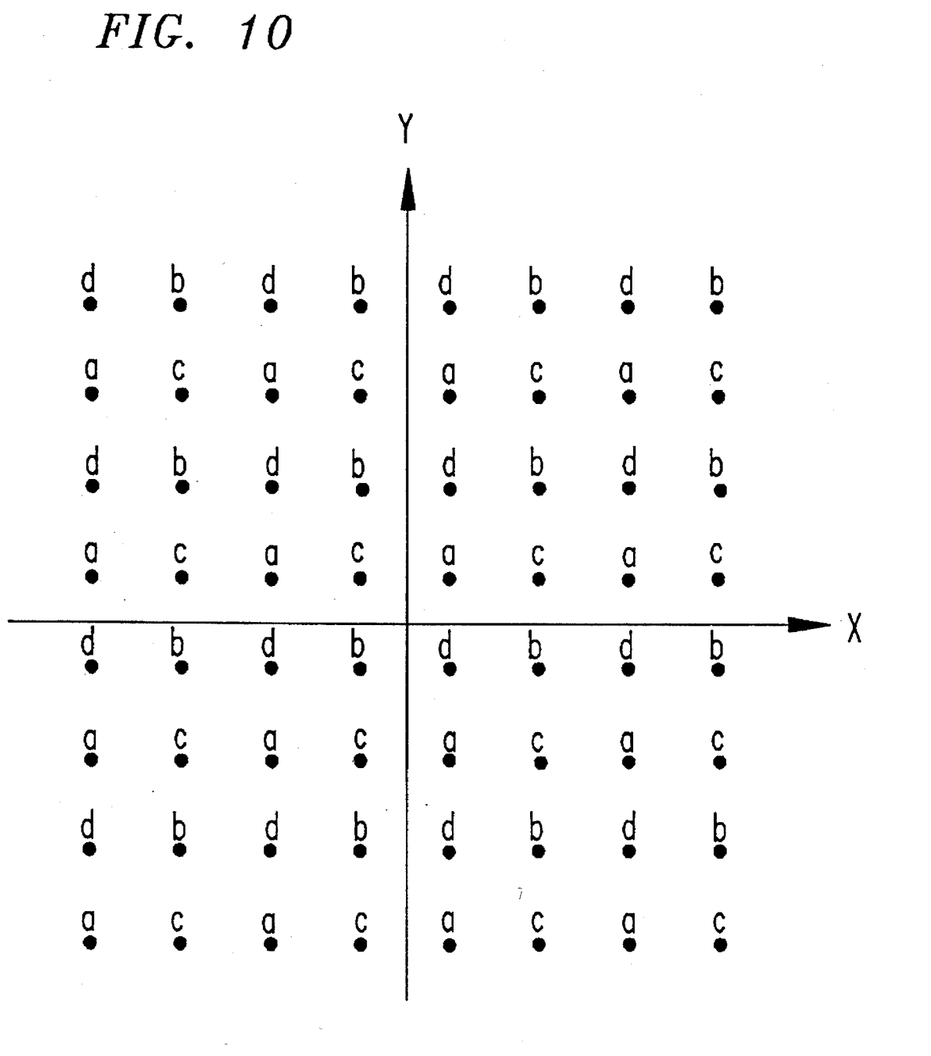
FIG. 10 shows a constellation that could be used in place of the constellation of FIG. 3 when the encoder and decoder of FIGS. 8 and 9 are used in the transmitter and receiver.

The output of trellis encoder 812 on lead 820 identifies one of eight subsets of symbols of a 4D constellation formed by concatenating a pair of 2D constellations shown in FIG. 10, the output of RS encoder 814 on lead 818 selects for transmission one of the symbols of the identified subset. In the decoder, maximum-likelihood decoder 920 provides the same general decision-making function that slicer 222 of FIG. 2 does. As such, maximum-likelihood decoder 920 outputs on leads 921 and 922 its best estimate of the bits that were provided on leads 816 and 818, respectively, in the encoder. The bits on lead 922 are RS-decoded by RS decoder 930 whose output bits, along with the bits on lead 921, are differentially decoded by differential decoder 907.

As in the embodiment described earlier, the two criteria for overcoming phase-rotation-induced changes at the input to RS decoder 930 must be met. As to the first criterion, RS encoder 814 may include either a full-length or shortened RS code and an appropriate implementation of RS decoder 930, per the discussion hereinabove, will be provided.

The second criterion is met by so structuring the trellis code and the assignment of bit values to the symbols of the various subsets of the 4D constellation in such a way that a 180-degree rotation of the constellation will result in the aforementioned complementation on lead 922. Moreover, the overall coding scheme is designed in such a way as to guarantee that only 180-degree rotations can, in fact, occur.

In this embodiment, that result is accomplished by doing two things. The first is to use a trellis code which, like the code disclosed in the aforementioned co-pending patent application, is only 180-degree rotationally invariant. By this it is meant that, upon the transmission of a sequence of symbols taken from a valid sequence of subsets, and upon the subsequent rotation of those symbols by 180 degrees, the resulting sequence of symbols is a sequence taken from another valid sequence of subsets (which, in this case, is, in fact, the same sequence of subsets). Since the code is only 180-degree rotationally invariant and not, for example, 90-degree rotationally invariant, a rotation by 90 or 270 degrees will not have the above property. Thus such a rotation will have a dramatic effect on the operation of maximum-likelihood decoder 920 and the occurrence of such a rotation can be quickly and readily detected. The second thing done is to, in fact, look for such a rotation. Upon detection of same, maximum-likelihood decoder 920 provides a control signal on lead 912 to equalizer/demodulator 210. The latter, responsive to the control signal, rotates its output by 90 degrees, thereby providing, as indicated above, an overall rotation which is either 0 degrees (i.e., no rotation) or 180 degrees.

There are many ways of detecting the occurrence of a rotation. One particularly advantageous way relies on my observation that, within the maximum-likelihood decoder, it will be case for at least certain trellis codes—including the specific trellis code noted above—that when there has been no rotation or a rotation with respect to which the code is invariant, the minimum path metric computed for a present symbol interval is more likely than not to be equal to the sum of a) the minimum path metric computed for the previous symbol interval with b) the minimum branch metric computed for the present symbol interval. (Even in a very noisy environment, in which there may be many symbol errors (e.g., greater than 10%), this equality criterion will be met at least about 60% of the time; and as the symbol error rate decreases, this percentage increases to about 90%.) On the other hand, when there is a rotation with respect to which the code is not invariant, then this equality criterion is not met about 50% of the time. Thus by monitoring this equality criterion, one can easily determine the presence of such a rotation.

The foregoing merely illustrates the principles of the invention. For example, it may be noted that, although the invention is illustrated herein as being implemented with discrete functional building blocks, e.g., encoders, mappers, etc., the functions of any one or more of those building blocks can be carried out using one or more appropriately programmed processors, digital signal processing (DSP) chips, etc. Thus although each of the various "means" recited in the claims hereof may correspond, in some embodiments, to specific circuitry which is specifically designed to perform the function of just that means, it will be appreciated that such "means" may alternatively correspond, in other embodiments, to the combination of processor-based circuitry with stored program instructions which cause that circuitry to perform the function in question.

It may also be noted that the approach shown in FIGS. 12–14 for unilevel coding could also be used in a multilevel coding context with the advantage, again, being that differential encoding/decoding can be eliminated.

It will thus be appreciated that those skilled in the art will be able to devise numerous and various alternative arrangements which, although not explicitly shown or described herein, embody the principles of the invention and are within its spirit and scope.

I claim:
1. Apparatus comprising:
   a non-binary redundancy encoder implementing a non-binary redundancy code comprising a plurality of valid code words,
   a differential encoder.
   means for applying a first stream of data to said differential encoder,
   means for applying at least a portion of an output of said differential encoder to said non-binary redundancy encoder, and
   means for transmitting, to a receiver, channel symbols selected from a predetermined signal constellation in response at least to the output of said non-binary redundancy encoder,
wherein said constellation exhibits at least one phase symmetry, and a rotation of said channel symbols by an amount corresponding to said phase symmetry converts at least one of said valid code words into an invalid code word.

2. The invention of claim 1 wherein said non-binary redundancy encoder is a shortened Reed-Solomon encoder.

3. The invention of claim 1 further comprising:
   a trellis encoder, and
   means for applying a second stream of data to said trellis encoder,
   said means for transmitting selecting said channel symbols in response, additionally, to the output of said trellis encoder.

4. The invention of claim 1 wherein said output of said non-binary redundancy encoder is a bit stream representing a first sequence of said valid code words for said non-binary redundancy code implemented by said non-binary redundancy encoder, wherein said non-binary redundancy code is such that said code words can be accurately decoded notwithstanding a particular deterministic change made to each of them, and wherein said means for transmitting and said constellation are such that, if, when transmitted to said receiver, said channel symbols become rotated by an amount corresponding to a phase symmetry of said constellation, a sequence of code words can be recovered from the channel symbols received at said receiver which differs from said first sequence of code words only in that each code word thereof includes said deterministic change.

5. Receiver apparatus for processing a received data-bearing signal which was generated by applying a stream of data to a differential encoder, applying at least a portion of an output of said differential encoder to a non-binary redundancy encoder implementing a non-binary redundancy code comprising a plurality of valid code words, and generating said data-bearing signal representative of channel symbols selected from a predetermined signal constellation in response at least to the output of said non-binary redundancy encoder, said receiver apparatus comprising:
   means for recovering from said data-bearing signal a recovered signal representing said output of said non-binary redundancy encoder,
   means for redundancy decoding said recovered signal to generate a redundancy decoded signal, and
   means for differentially decoding said redundancy decoded signal in order to recover said stream of data,
wherein said constellation exhibits at least one phase symmetry, and a rotation of said channel symbols by an amount corresponding to said phase symmetry converts at least one of said valid code words into an invalid code word.

6. The invention of claim 5 wherein said non-binary redundancy encoder is a shortened Reed-Solomon encoder and said means for redundancy decoding is a shortened Reed-Solomon decoder.

7. The invention of claim 5 wherein said channel symbols are selected additionally in response to the output of a trellis encoder whose input is a second stream of data and wherein said receiver apparatus further includes means for recovering said second stream of data from said received data-bearing signal.

8. The invention of claim 5 wherein said output of said non-binary redundancy encoder is a bit stream representing a first sequence of said valid code words for said non-binary redundancy code implemented by said non-binary redundancy encoder, wherein said generating of said data-bearing signal and said constellation are such that, if, when transmitted to said receiver, said channel symbols become rotated by an amount corresponding to a phase symmetry of said constellation, the sequence of code words in said recovered signal representing said output of said non-binary redundancy encoder differs from said first sequence of valid code words only in that each code word thereof includes said deterministic change, and wherein said means for redundancy decoding is so configured as to be able to accurately decode said recovered signal even if, upon such a rotation, the sequence of code words in said recovered signal is not a sequence of valid code words for said non-binary redundancy code.

9. A method comprising the steps of:

applying a first stream of data to a differential encoder, applying at least a portion of an output of said differential encoder to a non-binary redundancy encoder implementing: a non-binary redundancy code comprising a plurality of valid code words, selecting channel symbols from a predetermined signal constellation in response at least to the output of said non-binary redundancy encoder, and transmitting to a receiver a signal representing the selected channel symbols, wherein said constellation exhibits at least one phase symmetry, and a rotation of said channel symbols by an amount corresponding to said phase symmetry converts at least one of said valid code words into an invalid code word.

10. The invention of claim 9 wherein said non-binary redundancy encoder is a shortened Reed-Solomon encoder.

11. The invention of claim 9 comprising the further step of applying a second stream of data to a trellis encoder, said channel symbols being selected in response, additionally, to the output of said trellis encoder.

12. The invention of claim 9 wherein said output of said non-binary redundancy encoder is a bit stream representing a first sequence of said valid code words for said non-binary redundancy code implemented by said non-binary redundancy encoder, wherein said redundancy code is such that said code words can be accurately decoded notwithstanding a particular deterministic change made to each of them, and wherein said constellation and said selecting step are such that, if, when transmitted to said receiver, said channel symbols become rotated by an amount corresponding to a phase symmetry of said constellation, a sequence of code words can be recovered from the channel symbols received at said receiver which differs from said first sequence of code words only in that each code word thereof includes said deterministic change.

13. A method comprising the steps of:

applying a stream of data to a differential encoder, applying at least a portion of an output of said differential encoder to a non-binary redundancy encoder implementing a non-binary redundancy code comprising a plurality of valid code words, generating a data-bearing signal which represents channel symbols selected from a predetermined signal constellation in response at least to the output of said non-binary redundancy encoder, recovering from said data-bearing signal a recovered signal representing said output of said non-binary redundancy encoder, redundancy decoding said recovered signal to generate a redundancy decoded signal, and differentially decoding said redundancy decoded signal in order to recover said stream of data, wherein said constellation exhibits at least one phase symmetry, and a rotation of said channel symbols by an amount corresponding to said phase symmetry converts at least one of said valid code words into an invalid code word.

14. A method for processing a signal transmitted over a transmission channel, said signal representing a sequence of shortened Reed-Solomon frames that may have been subjected to a deterministic complementation of bits in one or more bit positions of each word of said frames, each frame being comprised of a number, n, of m-bit words, said method including the use of standard syndromes computed for said frame and modified syndromes computed for an augmented frame comprised of a) ($2^m-1-n$) m-bit stuffing words whose value is that arrived at by subjecting a m-bit null word to said deterministic complementation and b) the words of said received frame, said method comprising the steps of:

receiving said signal from said transmission channel, and Reed-Solomon decoding the sequence of shortened Reed-Solomon frames therefrom, said Reed-Solomon decoding step comprising the steps, performed in repetitive alternation, of a) initiating the use of said standard syndromes to carry out error correction/detection for ones of said received frames until it is determined that said shortened Reed-Solomon frames are being subjected to said deterministic complementation, and b) thereupon initiating the use of said modified syndromes to carry out error correction/detection for subsequent frames of said sequence until it is determined that said shortened Reed-Solomon frames are no longer being subjected to said predetermined complementation.

15. The invention of claim 14 comprising the further step of calculating said standard syndromes and said modified syndromes at least to the extent necessary in order to carry out steps a) and b).

16. The invention of claim 15 wherein said modified syndromes are calculated by adding respective fixed constants to said standard syndromes.

17. The invention of claim 16 wherein said constants are the syndromes for a frame consisting of a) ($2^m-1-n$) ones of said stuffing words and b) n m-bit null words.

18. The invention of claim 15 wherein it is determined that said shortened Reed-Solomon frames are being subjected to said deterministic complementation upon said modified syndromes becoming zero syndromes for a particular one of said frames, and wherein it is determined that said shortened Reed-Solomon frames are no longer being subjected to said deterministic complementation upon said standard syndromes becoming zero syndromes for a particular other one of said frames.

19. A method for processing a signal transmitted over a transmission channel, said signal representing a sequence of shortened Reed-Solomon frames that may have been subjected to a deterministic complementation of bits in one or more bit positions of each word of said frames, each frame being comprised of a number, n, of m-bit words, said method comprising the steps of:

receiving said signal from said channel,

Reed-Solomon decoding each frame of said sequence in response to the received signal, computing, for each frame being decoded, modified syndromes for an augmented frame comprised of a) ($2^m$–1–n) m-bit stuffing words whose value is that arrived at by subjecting an m-bit null word to said deterministic complementation and b) the words of the frame being decoded, and if said modified syndromes are zero syndromes for a particular one of said frames, thereupon subjecting subsequent frames of said sequence to a further such complementation prior to said Reed-Solomon decoding step.

20. The invention of claim 19 comprising the further step of terminating said further complementation in response to a determination that said modified syndromes are zero syndromes for a particular other one of said frames.

21. The invention of claim 19 wherein said decoding step includes the step of computing standard syndromes for said each frame.

22. The invention of claim 21 wherein said computing step includes the step of adding a respective constant to each of said standard syndromes.

23. The invention of claim 22 comprising the further step of terminating said further complementation in response to a determination that said modified syndromes are zero syndromes for a particular other one of said frames.

24. A method for processing a signal transmitted over a transmission channel, said transmitted signal having been coded with use of a non-binary redundancy encoder for implementing error correction, said method comprising the steps of:

receiving a signal corresponding to said transmitted signal from said transmission channel, determining whether said received signal is different than said transmitted signal, if said received signal is different than said transmitted signal, determining whether the difference therebetween is due to an occurrence of a rotation in said transmission channel;

if said difference is due to said occurrence of said rotation, correcting said received signal by compensating therefor, if said received signal is different than said transmitted signal, determining whether the difference therebetween is due to a bit error in said received signal, and if said difference is due to said bit error, correcting said bit error in said received signal with use of a non-binary redundancy decoder corresponding to said non-binary redundancy encoder.

25. The invention of claim 24 wherein said rotation comprises a deterministic change to said transmitted signal and wherein said step of correcting said received signal by compensating for said rotation comprises performing an inverse operation of said deterministic change.

26. The invention of claim 24 wherein said step of correcting said received signal by compensating for said rotation comprises applying a differential encoder thereto.

27. A receiver apparatus for processing a signal transmitted over a transmission channel, said transmitted signal having been coded with use of a non-binary redundancy encoder for implementing error correction, said receiver apparatus comprising:

means for receiving a signal corresponding to said transmitted signal from said transmission channel, means for determining whether said received signal is different than said transmitted signal, means for determining whether the difference between said received signal and said transmitted signal is due to an occurrence of a rotation in said transmission channel, means for correcting said received signal by compensating for said rotation, means for determining whether the difference between said received signal and said transmitted signal is due to a bit error in said received signal, and a non-binary redundancy decoder corresponding to said non-binary redundancy encoder and adapted to correct said bit error in said received signal.

28. The receiver apparatus of claim 27 wherein said rotation comprises a deterministic change to said transmitted signal and wherein said means for correcting said received signal by compensating for said rotation comprises means for performing an inverse operation of said deterministic change.

29. The receiver apparatus of claim 27 wherein said means for correcting said received signal by compensating for said rotation comprises a differential encoder.

\* \* \* \* \*